US012232140B2

(12) United States Patent
Ghelichi et al.

(10) Patent No.: US 12,232,140 B2
(45) Date of Patent: *Feb. 18, 2025

(54) TECHNIQUES FOR SHARED CHANNEL BACKOFF PROCEDURES IN WIRELESS COMMUNICATIONS SYSTEMS

(71) Applicant: QUALCOMM Incorporated, San Diego, CA (US)

(72) Inventors: Mahbod Ghelichi, San Diego, CA (US); James Francis Geekie, Carlsbad, CA (US); Arnaud Meylan, San Diego, CA (US); Sivaram Srivenkata Palakodety, San Diego, CA (US); Bao Vinh Nguyen, San Diego, CA (US); Michel Evan Chauvin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,318

(22) Filed: Jul. 26, 2023

(65) Prior Publication Data

US 2024/0023115 A1 Jan. 18, 2024

Related U.S. Application Data

(63) Continuation of application No. 17/321,882, filed on May 17, 2021, now Pat. No. 11,758,555.

(Continued)

(51) Int. Cl.
*H04W 72/23* (2023.01)
*H04L 1/00* (2006.01)
(Continued)

(52) U.S. Cl.
CPC .......... *H04W 72/23* (2023.01); *H04L 1/0008* (2013.01); *H04W 24/08* (2013.01); *H04W 28/0278* (2013.01); *H04W 74/0816* (2013.01)

(58) Field of Classification Search
None
See application file for complete search history.

(56) References Cited

U.S. PATENT DOCUMENTS

2010/0323743 A1 12/2010 Huan
2011/0296064 A1 12/2011 Ehsan et al.
(Continued)

OTHER PUBLICATIONS

International Preliminary Report On Patentability—PCT/US2021/032894—The International Bureau of WIPO—Geneva, Switzerland—Dec. 1, 2022.

(Continued)

*Primary Examiner* — Saumit Shah
(74) *Attorney, Agent, or Firm* — Dalei Dong; Holland & Hart LLP

(57) ABSTRACT

Methods, systems, and devices for wireless communications are described. A user equipment (UE) may receive, via a first carrier associated with a first radio access technology, at least a first uplink grant from a base station. The UE may implement one or more backoff schemes. For example, the UE may transmit, using resources indicated by at least the first uplink grant, an uplink message based on a temperature of one or more components of the UE satisfying a threshold, the uplink message including a transport block (TB) indicating data, a buffer status report (BSR) associated with the data, one or more padding bytes different from the data, or any combination thereof. The UE may monitor for at least a second uplink grant from the base station during a first time period based on transmitting the uplink message.

29 Claims, 10 Drawing Sheets

Related U.S. Application Data

(60) Provisional application No. 63/027,248, filed on May 19, 2020.

(51) Int. Cl.
*H04W 24/08* (2009.01)
*H04W 28/02* (2009.01)
*H04W 74/0816* (2024.01)

(56) References Cited

U.S. PATENT DOCUMENTS

| | | | |
|---|---|---|---|
| 2013/0039173 A1 | 2/2013 | Ehsan et al. | |
| 2013/0322331 A1 | 12/2013 | Ramkumar et al. | |
| 2016/0239057 A1 | 8/2016 | Kocagoez | |
| 2017/0167745 A1 | 6/2017 | Dortmund et al. | |
| 2018/0270699 A1* | 9/2018 | Babaei | H04W 28/0278 |
| 2018/0279359 A1 | 9/2018 | Liu et al. | |
| 2019/0280836 A1 | 9/2019 | Bhattad et al. | |
| 2020/0053793 A1* | 2/2020 | Loehr | H04W 80/02 |
| 2020/0107335 A1 | 4/2020 | Xue et al. | |
| 2021/0360685 A1* | 11/2021 | Huang | H04B 7/0697 |
| 2021/0368535 A1 | 11/2021 | Ghelichi et al. | |

OTHER PUBLICATIONS

International Search Report and Written Opinion—PCT/US2021/032894—ISA/EPO—Dec. 16, 2021.

* cited by examiner

TECHNIQUES FOR SHARED CHANNEL BACKOFF PROCEDURES IN WIRELESS COMMUNICATIONS SYSTEMS

CROSS REFERENCE

The present Application for Patent is a continuation of U.S. patent application Ser. No. 17/321,882, filed May 17, 2021, which claims the benefit of U.S. Provisional Patent Application No. 63/027,248 filed May 19, 2020, assigned to the assignee hereof, and expressly incorporated by reference herein.

FIELD OF DISCLOSURE

The present disclosure, for example, relates to wireless communications and more specifically to techniques for shared channel backoff procedures in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may receive downlink control information (DCI) from a network (e.g., a base station). The DCI may indicate one or more uplink grants. The UE may transmit uplink messages based on the uplink grants. However, in some examples the network may continue to transmit uplink grants without receiving a scheduling request from the UE, which may result in relatively higher power consumption (e.g., reduced battery life or thermal run away) and relatively inefficient communications.

SUMMARY

The described techniques relate to improved methods, systems, devices, and apparatuses that support techniques for shared channel backoff procedures in wireless communications systems. For example, the described techniques may enable a user equipment (UE) to implement one or more backoff schemes, which may result in relatively more efficient communications, reduced power consumption, reliable temperature control at the UE, among other advantages. In some examples, the UE may implement one or more cooling period states. For example, a UE may enter a first cooling period state (e.g., if a temperature of a component, such as a power amplifier, satisfies a threshold). The UE may transmit an uplink message in accordance with the first cooling period state and an uplink grant received from a network (e.g., a base station). For example, the uplink message may include data (e.g., application data), a buffer status report (BSR), and one or more padding bytes. Such a BSR and the one or more padding bytes may indicate to the network that the UE has no more application data to send after the uplink message. In some examples, the UE may monitor for further grants and if no grants are received for a time period of the first cooling period state, the UE may return to a normal operation mode. In some other examples, the network may continue to send grants. In such examples, the UE may enter a second cooling period state (e.g., the UE may transmit, for a time period, an uplink message including a BSR and a plurality of padding bytes), a third cooling period state (e.g., the UE may refrain from transmitting an uplink message for a time period), or a combination thereof.

In some examples, the UE may initiate a traffic switching operation, a connection release operation, or both. The traffic switching operation may include transmitting one or more reference signals (e.g., sounding reference signals (SRSs)) using a power different than a configured power. Such reference signals may enable the network to route traffic (e.g., data) to a different carrier (e.g., the network may determine that the carrier for the SRSs is experiencing relatively poor channel conditions and may route data to a different carrier associated with a different component of the UE). The UE may communicate via the different carrier, for example, until a temperature of a component of the UE (e.g., a power amplifier) reaches a second threshold. Additionally or alternatively, the connection release operation may include transmitting signaling to the network based on a temperature satisfying a threshold. For example, the UE may transmit, to a base station, signaling indicating a measurement associated with a first radio access technology (RAT), signaling indicating a detach request for the first RAT, signaling indicating a secondary cell group (SCG) failure, among other examples. Such signaling may enable the UE to release connection with the base station (e.g., refrain from communications using the first RAT), which may result in one or more advantages as described herein (e.g., reduced power consumption).

A method of wireless communications at a UE is described. The method may include receiving, via a first carrier associated with a first RAT, at least a first uplink grant from a base station, determining that a temperature of one or more components of the UE satisfies a threshold, transmitting, using resources indicated by at least the first uplink grant, an uplink message based on the temperature satisfying the threshold, the uplink message including a transport block (TB) indicating data, a BSR associated with the data, one or more padding bytes different from the data, or any combination thereof, and monitoring for at least a second uplink grant from the base station during a first time period based on transmitting the uplink message.

An apparatus for wireless communications at a UE is described. The apparatus may include a processor, memory coupled with the processor, and instructions stored in the memory. The instructions may be executable by the processor to cause the apparatus to receive, via a first carrier associated with a first RAT, at least a first uplink grant from a base station, determine that a temperature of one or more components of the UE satisfies a threshold, transmit, using resources indicated by at least the first uplink grant, an uplink message based on the temperature satisfying the threshold, the uplink message including a (TB) indicating data, a BSR associated with the data, one or more padding bytes different from the data, or any combination thereof, and monitor for at least a second uplink grant from the base station during a first time period based on transmitting the uplink message.

Another apparatus for wireless communications at a UE is described. The apparatus may include means for receiving, via a first carrier associated with a first RAT, at least a first uplink grant from a base station, determining that a temperature of one or more components of the UE satisfies a threshold, transmitting, using resources indicated by at least the first uplink grant, an uplink message based on the temperature satisfying the threshold, the uplink message including a TB indicating data, a BSR associated with the data, one or more padding bytes different from the data, or any combination thereof, and monitoring for at least a second uplink grant from the base station during a first time period based on transmitting the uplink message.

A non-transitory computer-readable medium storing code for wireless communications at a UE is described. The code may include instructions executable by a processor to receive, via a first carrier associated with a first RAT, at least a first uplink grant from a base station, determine that a temperature of one or more components of the UE satisfies a threshold, transmit, using resources indicated by at least the first uplink grant, an uplink message based on the temperature satisfying the threshold, the uplink message including a TB indicating data, a BSR associated with the data, one or more padding bytes different from the data, or any combination thereof, and monitor for at least a second uplink grant from the base station during a first time period based on transmitting the uplink message.

Some examples of the method, apparatuses, and non-transitory computer-readable medium described herein may further include operations, features, means, or instructions for receiving, from the base station, at least the second uplink grant during the first time period based on the monitoring, transmitting, using resources indicated by at least the second uplink grant, a second uplink message in response to receiving at least the second uplink grant, the second uplink message including a second TB indicating the BSR associated with the data and a set of padding bytes different from the data, and monitoring for at least a third uplink grant from the base station during a second time period based on transmitting the second uplink message.

Some examples of the method, apparatuses, and non-transitory computer-readable medium described herein may further include operations, features, means, or instructions for receiving, from the base station, at least the third uplink grant during the second time period based on the monitoring, and refraining, during a third time period, from transmitting a third uplink message in response to receiving at least the third uplink grant.

Some examples of the method, apparatuses, and non-transitory computer-readable medium described herein may further include operations, features, means, or instructions for receiving, from the base station, at least the second uplink grant during the first time period based on the monitoring, and refraining, during a second time period, from transmitting a second uplink message in response to receiving at least the second uplink grant.

Some examples of the method, apparatuses, and non-transitory computer-readable medium described herein may further include operations, features, means, or instructions for identifying a configuration for transmitting one or more reference signals in response to the first uplink grant, the configuration indicating a first power for transmitting the one or more reference signals, and transmitting the one or more reference signals using a second power based on the temperature of the one or more components satisfying the threshold.

In some examples of the method, apparatuses, and non-transitory computer-readable medium described herein, a value of the second power may be less than a value of the first power.

Some examples of the method, apparatuses, and non-transitory computer-readable medium described herein may further include operations, features, means, or instructions for communicating with the base station via a second carrier different than the first carrier in response to the transmitted one or more reference signals.

Some examples of the method, apparatuses, and non-transitory computer-readable medium described herein may further include operations, features, means, or instructions for transmitting signaling to the base station based on the temperature of the one or more components of the UE satisfying the threshold. In some examples of the method, apparatuses, and non-transitory computer-readable medium described herein, the signaling indicates a measurement associated with the first RAT. In some examples of the method, apparatuses, and non-transitory computer-readable medium described herein, the signaling comprises a detach request for the first RAT or an indication of a SCG failure.

Some examples of the method, apparatuses, and non-transitory computer-readable medium described herein may further include operations, features, means, or instructions for communicating with the base station via a second RAT different from the first RAT based on transmitting the signaling.

In some examples of the method, apparatuses, and non-transitory computer-readable medium described herein, the signaling may include operations, features, means, or instructions for operating in an idle mode based on transmitting the signaling.

In some examples of the method, apparatuses, and non-transitory computer-readable medium described herein, the UE may be operating in a standalone mode and the signaling includes the detach request.

In some examples of the method, apparatuses, and non-transitory computer-readable medium described herein, the UE may be operating in a non-standalone (NSA) mode and the signaling includes the indication of the SCG failure.

In some examples of the method, apparatuses, and non-transitory computer-readable medium described herein, the data may include operations, features, means, or instructions for identifying a first value of the BSR based on an amount of the application data, where the BSR indicates a second value different from the first value based on the temperature of the one or more components of the UE satisfying the threshold. In some examples, the data includes application data of the UE.

Some examples of the method, apparatuses, and non-transitory computer-readable medium described herein may further include operations, features, means, or instructions for operating in a first mode prior to receiving at least the first uplink grant, and operating in a second mode based on the temperature of the one or more components of the UE satisfying the threshold, the second mode including one or more cooling period states.

In some examples of the method, apparatuses, and non-transitory computer-readable medium described herein, operating in the second mode may include operations, features, means, or instructions for refraining from transmitting first data to the base station in accordance with the second mode, the first data including at least a portion of application data, and communicating second data with the base station in accordance with the second mode, the second data including control information, data associated with a higher priority than the first data, or a combination thereof.

Some examples of the method, apparatuses, and non-transitory computer-readable medium described herein may further include operations, features, means, or instructions for operating in the first mode upon expiration of a first time period based on failing to receive at least a second uplink grant from the base station.

Some examples of the method, apparatuses, and non-transitory computer-readable medium described herein may further include operations, features, means, or instructions for determining that the temperature of the one or more components satisfies a second threshold, and operating in the first mode based on the temperature satisfying the second threshold.

DETAILED DESCRIPTION

Figure 1:
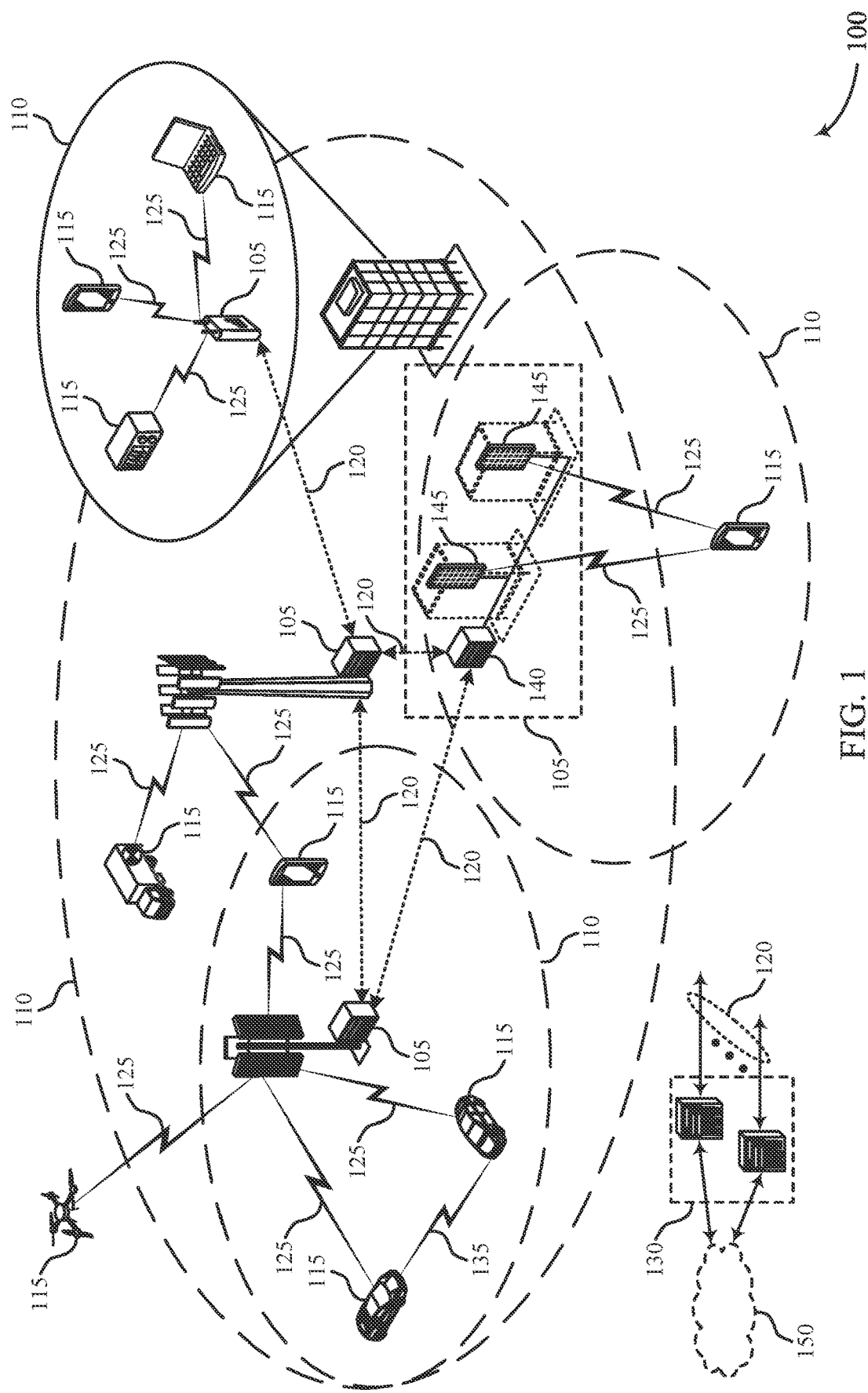
FIG. 1 illustrates an example of a system for wireless communications that supports techniques for shared channel backoff procedures in wireless communications systems in accordance with various aspects of the present disclosure.

A user equipment (UE) and a base station may communicate in a wireless communications system (e.g., a communications network). For example, the UE may send a scheduling request indicating that the UE has data to send via an uplink channel (e.g., a physical uplink shared channel (PUSCH)). The base station may transmit downlink control information (DCI) indicating one or more uplink grants based on the scheduling request. However, some wireless communications systems may implement techniques to reduce end-to-end delay for communications between the network (e.g., a base station) and the UE. For example, some applications may use a relatively high quality of service (QoS) (e.g., low delay and jitter, increased throughput, and the like), such as network-based gaming applications, augmented reality applications, operating system (OS) driven applications, among other examples. In such examples, some wireless communications systems may perform uplink pre-scheduling to reduce the delay associated with the UE requesting uplink resources. For example, a base station may transmit uplink grants to one or more UEs regardless of whether the UEs have transmitted scheduling requests (e.g., regardless of whether the UEs have application data to transmit). Such techniques may be relatively inefficient and increase power consumption at the UE (e.g., the uplink pre-scheduling may result in data stalling, thermal run-away, device shut-off, etc.).

In accordance with the techniques described herein, a UE may be enabled with one or more adaptive (e.g., smart) backoff schemes to realize relatively more efficient communications (e.g., a reduced chance of data stalling), reduced power consumption, reliable temperature control at the UE, among other advantages. In some examples, the UE may implement one or more cooling period states in accordance with a backoff scheme. For example, the UE may determine that a temperature of one or more components satisfies a threshold (e.g., the temperature of a power amplifier exceeds a temperature threshold). The UE may enter a first cooling period state based on the temperature satisfying the threshold. The UE may transmit an uplink message in accordance with the first cooling period state and an uplink grant received from a network (e.g., a base station). For example, the uplink message may include data (e.g., application data), a buffer status report (BSR), and one or more padding bytes. The uplink message may indicate to the network that the UE has no more application data to send after the uplink message (e.g., a BSR value of 0 may indicate there is no further application data buffered at the UE, the network may determine from the padding bytes that the application data transmission is complete, etc.). Such an uplink message may enable the UE to refrain from transmitting further uplink messages for a time period (e.g., until a temperature of the component satisfies a second threshold). For example, the UE may monitor for further grants and if no grants are received for a time period of the first cooling period state, the UE may return to a normal operation mode.

In some other examples, the network may continue to send grants. In such examples, the UE may enter a second cooling period state (e.g., the UE may transmit an uplink message including a BSR and a plurality of padding bytes but does not include any application data), a third cooling period state (e.g., the UE may refrain from transmitting an uplink message for a time period), or a combination thereof. In some examples, if the network continues to send uplink grants during the second cooling period state, the third cooling period state, or both, the UE may enter the first cooling period state, which may enable the UE to transmit application data (e.g., to prevent data stalling).

Additionally or alternatively, the UE may initiate a traffic switching operation, a connection release operation, or both. The traffic switching operation may include transmitting one or more reference signals (e.g., sounding reference signals (SRSs)) using a power different than a configured power. Such reference signals may enable the network to route traffic (e.g., data) to a different carrier (e.g., the network may determine that the carrier for the SRSs is experiencing relatively poor channel conditions and may route data to a different carrier associated with a different component of the UE). The UE may communicate via the different carrier, for example, until a temperature of a component of the UE (e.g., a power amplifier) reaches a second threshold. Additionally or alternatively, the connection release operation may include transmitting signaling to the network based on the temperature satisfying a threshold. For example, the UE may transmit, to a base station, signaling indicating a measurement associated with a first radio access technology (RAT), signaling indicating a detach request for the first RAT, signaling indicating a secondary cell group (SCG) failure, among other examples. Such signaling may enable the UE to release connection with the base station (e.g., refrain from communications using the first RAT), which may result in one or more advantages as described herein (e.g., reduced power consumption).

Aspects of the disclosure are initially described in the context of wireless communications systems. Aspects of the disclosure are then described in the context of timelines and flowcharts. Aspects of the disclosure are further illustrated by and described with reference to apparatus diagrams, system diagrams, and flowcharts that relate to techniques for shared channel backoff procedures in wireless communications systems.

FIG. 1 illustrates an example of a wireless communications system 100 that supports techniques for shared channel backoff procedures in wireless communications systems in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

In some examples, a UE 115 may send a scheduling request indicating that the UE 115 has data to send via an uplink channel (e.g., a PUSCH). A base station 105 may transmit DCI indicating one or more uplink grants based on the scheduling request. However, some wireless communications systems 100 may implement techniques to reduce end-to-end delay for communications between the network (e.g., a base station 105) and the UE 115. For example, some applications may use a relatively high QoS (e.g., low delay and jitter, increased throughput, and the like), such as network-based gaming applications, augmented reality applications, operating system driven applications, among other examples. In such examples, some wireless communications systems 100 may perform uplink pre-scheduling to reduce the delay associated with the UE 115 requesting uplink resources. For example, a base station 105 may transmit uplink grants to one or more UEs 115 regardless of whether the UEs 115 have transmitted scheduling requests (e.g., regardless of whether the UEs 115 have application data to transmit). Such techniques may be relatively inefficient and increase power consumption at the UE 115 (e.g., the uplink pre-scheduling may result in data stalling, thermal run-away, device shut-off, etc.).

In accordance with the techniques described herein, devices of the wireless communications system 100 (e.g., a UE 115) may be enabled with one or more adaptive (e.g., smart) backoff schemes to realize relatively more efficient communications (e.g., a reduced chance of data stalling), reduced power consumption, reliable temperature control at the UE 115, among other advantages. In some examples, the UE 115 may implement one or more cooling period states in accordance with a backoff scheme. For example, the UE 115 may determine that a temperature of one or more components satisfies a threshold (e.g., the temperature of a power amplifier exceeds a temperature threshold). The UE 115 may enter a first cooling period state based on the temperature satisfying the threshold. The UE 115 may transmit an uplink message in accordance with the first cooling period state and an uplink grant received from a network (e.g., a base station). For example, the uplink message may include data (e.g., application data), a BSR, and one or more padding bytes. The uplink message may indicate to the network that the UE 115 has no more application data to send after the uplink message (e.g., a BSR value of 0 may indicate there is no further application data buffered at the UE 115, the network may determine from the padding bytes that the application data transmission is complete, etc.). Such an uplink message may enable the UE 115 to refrain from transmitting further uplink messages for a time period (e.g., until a temperature of the component satisfies a second threshold). For example, the UE 115 may monitor for further grants and if no grants are received for a time period of the first cooling period state, the UE 115 may return to a normal operation mode.

In some other examples, the base station 105 may continue to send grants. In such examples, the UE 115 may enter a second cooling period state (e.g., the UE 115 may transmit an uplink message including a BSR and a plurality of padding bytes but the message may not include any application data), a third cooling period state (e.g., the UE 115 may refrain from transmitting an uplink message for a time period), or a combination thereof. In some examples, if the base station 105 continues to send uplink grants during the second cooling period state, the third cooling period state, or both, the UE 115 may enter the first cooling period state, which may enable the UE 115 to transmit application data (e.g., to prevent data stalling).

Additionally or alternatively, the UE 115 may initiate a traffic switching operation, a connection release operation, or both. The traffic switching operation may include transmitting one or more reference signals (e.g., SRSs) using a power different than a configured power. Such reference signals may enable the base station 105 to route traffic (e.g., data) to a different carrier (e.g., the network may determine that the carrier for the SRSs is experiencing relatively poor channel conditions and may route data to a different carrier associated with a different component of the UE 115). The UE 115 may communicate via the different carrier, for example, until a temperature of a component of the UE 115 (e.g., a power amplifier) reaches a second threshold. Additionally or alternatively, the connection release operation may include transmitting signaling to the base station 105 based on the temperature satisfying a threshold. For example, the UE 115 may transmit signaling indicating a measurement associated with a first RAT, signaling indicating a detach request for the first RAT, signaling indicating a SCG failure, among other examples. Such signaling may enable the UE 115 to release connection with the base station (e.g., refrain from communications using the first RAT), which may result in one or more advantages as described herein (e.g., reduced power consumption, reduce chance of the UE 115 shutting down due to overheating, among other advantages).

Figure 2:
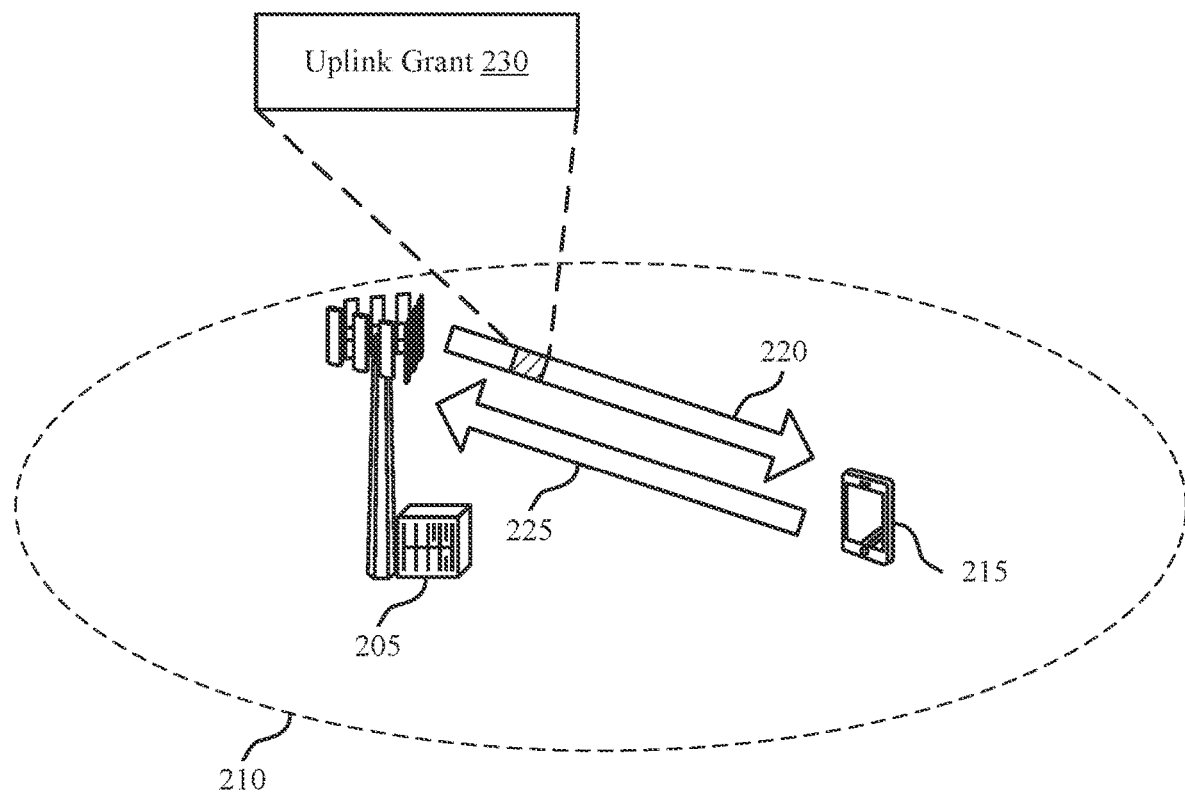
FIG. 2 illustrates an example of a wireless communications system that supports techniques for shared channel backoff procedures in wireless communications systems in accordance with various aspects of the present disclosure.

FIG. 2 illustrates an example of a wireless communications system 200 that supports techniques for shared channel backoff procedures in wireless communications systems in accordance with various aspects of the present disclosure. In some examples, the wireless communications system 200 may implement aspects of wireless communications system 100. The wireless communications system 200 may include a base station 205 and a UE 215, which may be examples of a base station 105 and a UE 115 as described with reference to FIG. 1.

The wireless communications system 200 may illustrate communications between the UE 215 and the base station 205 in a coverage area 210 supported by the base station 205. For example, the base station 205 may send downlink transmissions 220 to the UE 215 and the UE 215 may send uplink transmissions 225 to the base station 205. The base station 205 may send an uplink grant 230 to the UE 215 (e.g., in DCI of a PDCCH). The uplink grant 230 may indicate resources (e.g., time frequency resources) for an uplink transmission 225 (e.g., an uplink message on a PUSCH). In some examples, the base station 205 and the UE 215 may communicate using one or more carriers, one or more RATs, or both.

In some examples, the wireless communications system 200 may support different applications using different configurations. For example, some applications may use a relatively high QoS (e.g., low delay and jitter, increased throughput, and the like), such as network-based gaming applications, augmented reality applications, operating system driven applications, among other examples of applications. Some networks (e.g., the wireless communications system 200) may use different configurations depending on the different supported applications in the network. However, the multiple different configurations may result in inefficiencies for UEs 215, such as thermal issues leading to involuntary shutdown or service interruption, low performance, high power consumption, reduced batter life, etc.

As an illustrative example, some networks may be configured to support applications using a relatively high amount of bi-directional communication and data exchange (e.g., relatively high quantities of uplink data and downlink data), such as network-based gaming applications and augmented reality applications. In some examples, uplink transmission or uplink data arrival (e.g., from OS driven applications) in the UE 215 may use extra interaction with the network (e.g., the base station 205) to request resources, which may result in a delay that does not support some applications. For example, the UE 215 may transmit a scheduling request on PUSCH or physical uplink control channel (PUCCH) to the base station 205 to notify the network that the UE 215 has uplink data to transmit and is requesting uplink resources. The base station 205 may perform scheduling in accordance with the scheduling request (e.g., the base station 205 may determine how and when to give the UE 215 the uplink grant 230 indicating resources to transmit uplink data). The UE 215 may be configured to follow the indicated uplink grant 230 (e.g., the UE 215 may transmit during the resources indicated by the uplink grant 230 even if the UE 215 has no application data), for example, in order to maintain a connection with the network (e.g., the base station 205 may release the UE 215 from service if the UE 215 fails to respond to allocated uplink resources for one or more attempts to receive an uplink message from the UE 215).

In order to support some such applications, some networks may reduce the end-to-end delay for communications between the base station 205 and the UE 215 by implementing uplink pre-scheduling. For example, the base station 205 may transmit uplink grants 230 to the UE 215 regardless of whether the UE 215 has transmitted a scheduling request (e.g., regardless of whether the UE 215 has uplink data to transmit). However, such pre-scheduling may result in inefficient communications (e.g., resources allocated to the UE 215 may not be used to transmit application data) and inefficient power usage (e.g., increased power consumption, reduced battery life, etc.) at the UE 215, for example, due to the UE 215 being configured to "honor" uplink grants 230 (e.g., transmitting signals using resources of the uplink grant 230 even if the UE 215 does not have data to transmit). In some examples, uplink transmissions 225 may be relatively power consuming and may lead to thermal run away if the UE 215 continues to transmit continuously based on the base station 205 continuously sending uplink grants 230. For example, a power amplifier of the UE 215 may be used for uplink transmissions 225 using a first RAT, a first carrier, or both. The power amplifier may overheat past a tolerance if the UE 215 is configured with uplink pre-scheduling from the base station 205.

In some examples, the UE 215 may implement a PUSCH backoff algorithm in order to throttle uplink transmissions 225 and cool down the UE 215 (e.g., the power amplifier) while maintaining connection to the base station 205. For example, the UE 215 may transmit a "fake" BSR report indicating that the UE 215 does not have any further uplink data, for example, even if the UE 215 does have uplink data to transmit. In networks using a configuration that does not implement uplink prescheduling, the PUSCH backoff algorithm may result in the UE 215 entering a cooling period (e.g., a period of no received uplink grants and no uplink transmissions 225). However, as discussed above, some networks may use different configurations. For example, if a network uses uplink pre-scheduling, the PUSCH backoff algorithm may result in data stalling, thermal overheating, connection failure, or involuntary shutdown.

Accordingly, the techniques described herein may enable the devices of the wireless communications system 200 (e.g., the UE 215) to implement one or more adaptive backoff algorithms (e.g., backoff schemes). For example, the UE 215 may implement one or more cooling period states in accordance with an adaptive backoff algorithm. For example, the UE 215 may determine that a temperature of one or more components satisfies a threshold (e.g., the temperature of a power amplifier exceeds a temperature threshold). The UE 215 may enter a first cooling period state based on the temperature satisfying the threshold. The UE 215 may transmit an uplink message in accordance with the first cooling period state and an uplink grant 230 received from the base station 205. For example, the uplink message may include data (e.g., application data), a BSR, and one or more padding bytes. The uplink message may indicate to the base station 205 that the UE 215 has no more application data to send after the uplink message (e.g., a BSR value of 0 may indicate there is no further application data buffered at the UE 215, the base station 205 may determine from the padding bytes that the application data transmission is complete, etc.). In some examples, the UE 215 may monitor for further uplink grants 230 and if no uplink grants 230 are received for a time period of the first cooling period state, the UE 215 may return to a normal operation mode.

In some other examples, the base station 205 may continue to send uplink grants 230 despite the uplink message associated with the first cooling period state. In such examples, the UE 215 may enter a second cooling period state (e.g., the UE 215 may transmit an uplink message including a BSR and a plurality of padding bytes, but the message may not include any application data), a third cooling period state (e.g., the UE 215 may refrain from transmitting an uplink message for a time period), or a combination thereof. In some examples, if the base station 205 continues to send uplink grants during the second cooling period state, the third cooling period state, or both, the UE 215 may enter the first cooling period state again, which may enable the UE 215 to transmit application data (e.g., to prevent data stalling) while also regulating a temperature of one or more components of the UE 215.

Additionally or alternatively, the UE 215 may implement other backoff schemes in addition or alternative to implementing the one or more cooling period states. For example, the UE 215 may initiate a traffic switching operation, a connection release operation, or both. The traffic switching operation may include transmitting one or more reference signals (e.g., SRSs) using a power different than a configured power. Such reference signals may enable the base station 205 to route traffic (e.g., data) from a first carrier to a second carrier (e.g., the base station 205 may determine that the first carrier associated with the SRSs is experiencing relatively poor channel conditions and may route data to the second carrier associated with a different power amplifier of the UE 215). The UE 215 may communicate via the second carrier (e.g., using a different power amplifier) until a temperature of the power amplifier of the UE 215 that is associated with the first carrier reaches a desired temperature (e.g., a temperature threshold). Additionally or alternatively, the connection release operation may include transmitting signaling to the base station 205 based on the temperature satisfying a threshold. For example, the UE 215 may transmit signaling indicating a measurement associated with a first RAT, signaling indicating a detach request for the first RAT, signaling indicating a SCG failure, among other examples. Such signaling may enable the UE 215 to release connection with the base station 205 (e.g., refrain from communications using the first RAT), which may result in one or more advantages as described herein (e.g., reduced power consumption, reduced chance of the UE 215 shutting down due to overheating, among other advantages).

Figure 3:
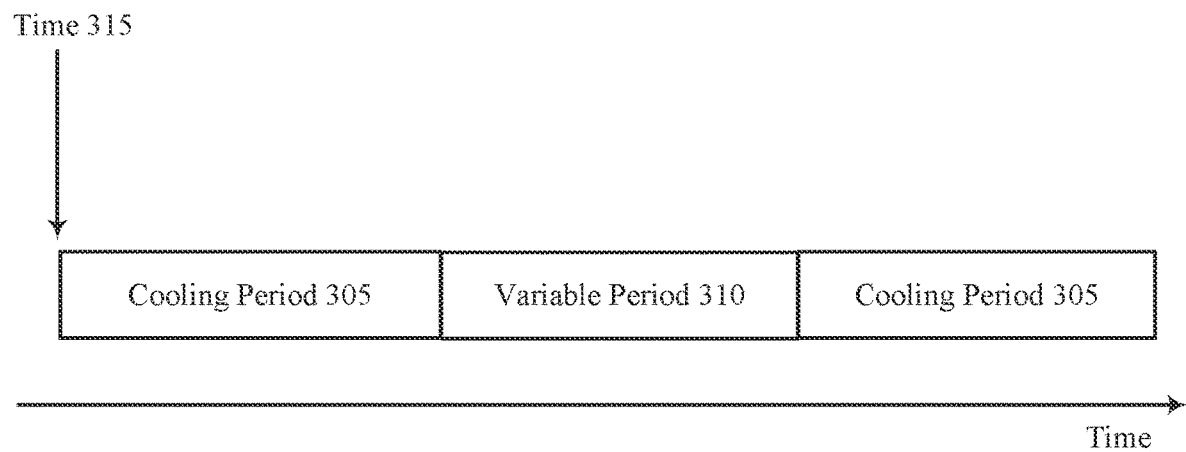
FIG. 3 illustrates an example of a timeline that supports techniques for shared channel backoff procedures in wireless communications systems in accordance with various aspects of the present disclosure.

FIG. 3 illustrates an example of a timeline 300 that supports techniques for shared channel backoff procedures in wireless communications systems in accordance with various aspects of the present disclosure. In some examples, the timeline 300 may implement aspects of wireless communications system 100 and wireless communications system 200. For example, the timeline 300 may be implemented by a UE 115 or a UE 215 as described with reference to FIGS. 1 and 2, respectively. The timeline 300 may illustrate an example of a backoff scheme.

The timeline 300 may include cooling periods 305 and a variable period 310. A UE may initiate a backoff scheme at time 315. For example, the UE may enter a cooling period 305, for example, based on detecting that a temperature of the UE (e.g., one or more components of the UE) satisfy a threshold. In some examples, the timeline 300 may illustrate an example of uplink throttling to reduce a duty cycle of PUSCH transmissions (e.g., reduce a time that a power amplifier associated with a carrier, a RAT, or both is active), which may reduce the power consumption at the UE. In some examples, a duration of a cooling period 305 may be configured at the UE (e.g., pre-configured at the UE, signaled to the UE from a network, or a combination thereof). As an illustrative example, the UE may enter the cooling period 305 for 130 ms. In some examples, a UE may throttle shared channel data during the timeline 300 but may refrain from throttling other data, such as control information. For example, control PDUs (e.g., acknowledgement messages, negative acknowledgement messages, MAC-CE messages, channel starting frequency (CSF) messages) may not be throttled and the UE may transmit the control PDUs, for example, with relatively little impact on the backoff scheme because the network may not interpret such control data as application data.

In some examples, the UE may signal BSRs during the cooling period 305 in accordance with a calculated target rate (e.g., a target uplink data throughput). For example, the UE may calculate the target rate based on an estimate (e.g., an estimate from a layer 2 switch of the UE). In some examples, a current target uplink throughput rate may be reduced to a value of the calculated target rate (e.g., reduced in steps of ten percent down to 1 Mbps, among other examples). The UE may signal a BSR aligned with the new target rate to the network. In some examples, the BSR may indicate an amount of data buffered at the UE. The BSR signaled by the UE may be an example of a "fake" BSR that may enable the UE to turn off a power amplifier during the cooling period 305. For example, the BSR associated with the calculated target rate may be a different value than a BSR associated with a target rate prior to the cooling period 305. During the variable period 310, the UE may be configured to transmit both PUSCH messages and PUCCH messages (e.g., uplink application information and uplink control information). Additionally or alternatively, the UE may report BSR values such that the scheduling from the network converges a data throughput to the calculated target rate.

In some examples, the UE may not transmit PUSCH messages during the cooling period 305. The UE may, however, transmit PUCCH messages during the cooling period 305. In some examples, the UE may receive an uplink grant during the cooling period 305. In such examples, a BSR value of zero may be transmitted to the network and a timer of the cooling period 305 may be restarted. Additionally or alternatively, an entire transport block (TB) of the uplink message including the zero BSR may be padding bytes (e.g., bytes that do not indicate data and are transmitted to honor an uplink grant without indicating information).

In accordance with the techniques described herein, the UE may implement one or more adaptative backoff schemes in addition or alternative to the backoff scheme illustrated by the timeline 300. For example, the UE may implement different cooling period states for the cooling periods 305. As an illustrative example, the UE may transmit application data along with one or more padding bytes (e.g., a minimum quantity of padding bytes, such as one padding byte) during a cooling period 305, which may avoid data stalling (e.g., no application data may be sent if the UE transmits a TB of padding bytes based on receiving an uplink grant in a cooling period 305, restarts a timer of a cooling period 305, and continues to receive uplink grants). That is, the UE may be enabled to enter one or more cooling period states if the UE detects uplink grants during a cooling period 305, as described with reference to FIG. 4, which may enable the UE to ensure a desired temperature, transmit application data, or both in a system implementing uplink pre-scheduling. Additionally or alternatively, the UE may initiate a traffic switching operation, a connection release operation, or both as described with reference to FIG. 4.

Figure 4:
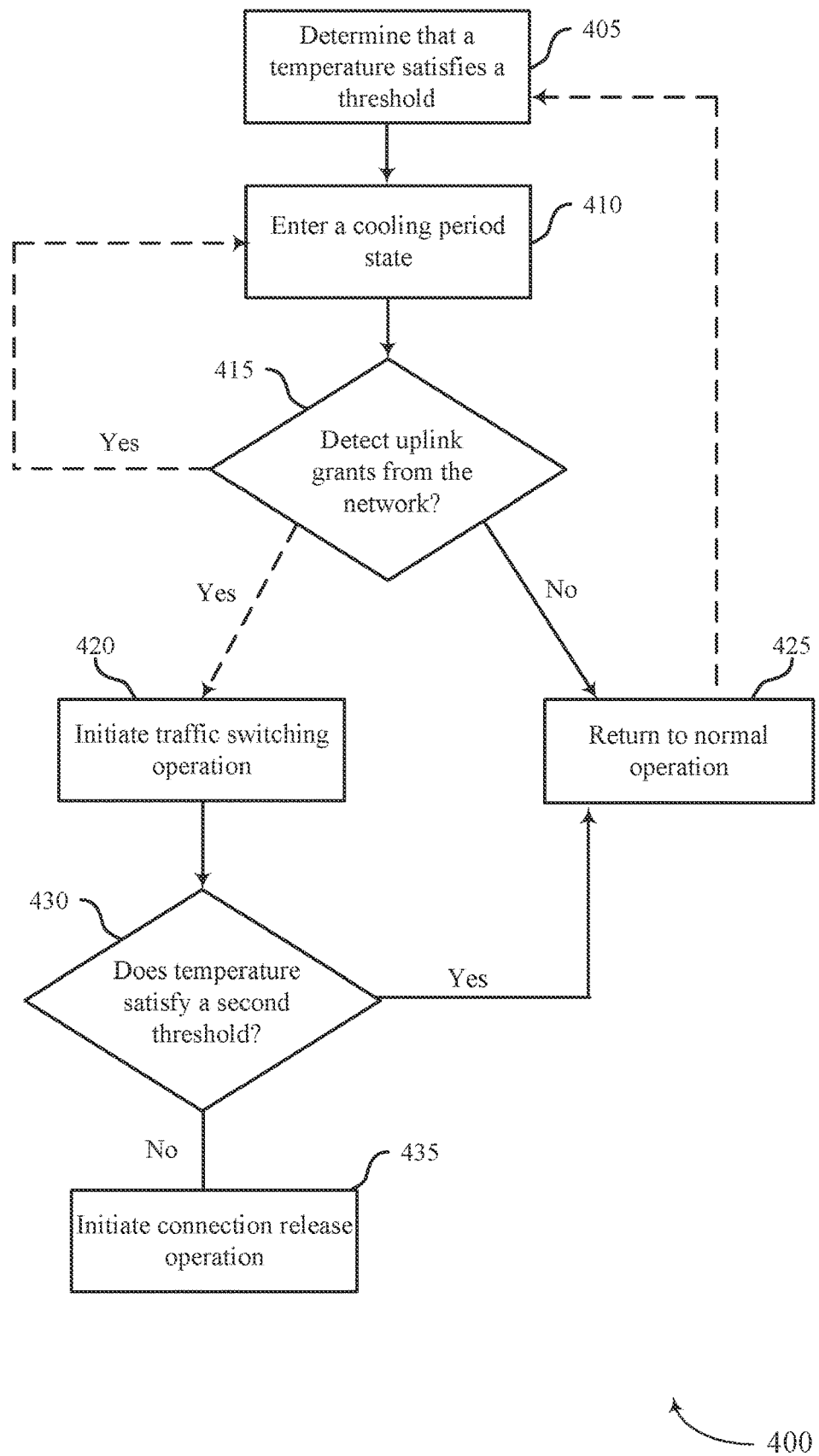
FIG. 4 illustrates an example of a flowchart that supports techniques for shared channel backoff procedures in wireless communications systems in accordance with various aspects of the present disclosure.

FIG. 4 illustrates an example of a flowchart 400 that supports techniques for shared channel backoff procedures in wireless communications systems in accordance with various aspects of the present disclosure. In some examples, the flowchart 400 may implement aspects of wireless communications system 100 or wireless communications system 200. For example, the flowchart 400 may be implemented by a UE as described with reference to FIGS. 1-3 (e.g., a UE 115 or a UE 215). The flowchart 400 may illustrate example operations for implementing one or more backoff schemes. In some examples, the operations of the flowchart 400 may be implemented in a different order, some operations may be removed, further operations may be added, or any combination thereof.

At 405, a UE may determine that a temperature satisfies a threshold. For example, a UE may communicate with a network (e.g., a base station) using a power amplifier associated with a first RAT, a first carrier, or both, a second power amplifier associated with a second RAT, a second carrier, or both, etc. The UE may monitor the temperature of the UE (e.g., temperatures of one or more components such as the power amplifiers). The UE may compare the monitored temperature to a threshold. The UE may determine that the temperature satisfies the threshold based on the comparison (e.g., the temperature of a power amplifier may be greater or equal to a threshold temperature). In some examples, the UE may switch from a normal operation mode to a cooling operation mode (e.g., the UE may implement a backoff scheme as described herein to attempt to reduce the temperature below the threshold).

At 410, the UE may enter a cooling period state. For example, in accordance with a backoff scheme, the UE may enter one or more cooling period states of an adaptive cooling period (e.g., a cooling period 305). In some examples, the UE may enter a first cooling period state. In the first cooling period state, the UE may transmit an uplink message including a TB using resources indicated by an uplink grant. The TB may include a BSR (e.g., a BSR with a value of 0) and one or more padding bytes (e.g., a minimum quantity of padding bytes such as one padding byte), and the UE may use the remainder of the TB for building application data (e.g., the TB may include the BSR, application data, and padding bytes to maintain data communications while signaling to the network that the UE does not have additional application data to transmit).

In some examples, the UE may enter a second cooling period state. In the second cooling period state, the UE may transmit an uplink message including a TB using resources indicated by an uplink grant. The TB may include a BSR (e.g., a BSR with a value of 0) and the remainder of the TB may be filled with padding bytes. In some examples, the UE may enter a third cooling period state. For example, in the third cooling period state, the UE may ignore uplink grants and refrain from transmitting uplink transmissions (e.g., for both uplink transmissions and retransmissions) for a time period.

In some examples, the UE may maintain some communications during the cooling period state at 410. For example, the UE may continue to communicate control information or relatively high priority data (e.g., with a QoS class identifier (QCI) satisfying a threshold such as a QCI less than 5). As an illustrative example, the UE may build control for logical channels in accordance with an indication of QoS priority associated with each channel.

At 415, the UE may monitor for one or more grants from the network. For example, a cooling period state may be associated with a timer period (e.g., the first cooling period state may be associated with a time period of X ms, the second cooling period state may be associated with a time period of Y ms, and the third cooling period state may be associated with a time period of Z ms). The UE may determine whether the network continued to send uplink grants during a time period of a cooling period state. In some examples, the UE may detect that no grants were received for a time period (e.g., T ms) after entering one or more cooling period states (e.g., the first cooling period state, the second cooling period state, the third cooling period state, or a combination thereof). In such examples, the UE may return to a normal operation mode at 425 (e.g., the UE may leave a cooling period state based on an expiration of a timer, based on a temperature of the component satisfying a second threshold, or both).

In some other examples, the UE may receive one or more uplink grants from the network during the cooling period state (e.g., after sending an uplink message indicating a BSR, padding bytes, or both in accordance with a cooling period state). In some such examples, the UE may enter a different cooling period state and repeat operations 410 and 415. As an illustrative example, the UE may enter the first cooling period state upon detecting that the temperature satisfies the threshold (e.g., the UE may transmit an uplink message in accordance with the first cooling period state and monitor for uplink grants for X ms). The UE may receive one or more uplink grants during a time period of the first cooling period state and the UE may enter the second cooling period state based on receiving the one or more uplink grants. (e.g., the UE may transmit an uplink message in accordance with the second cooling period state and monitor for uplink grants for Y ms). The UE may receive one or more uplink grants during a time period of the second cooling period state and the UE may enter the third cooling period state based on receiving the one or more uplink grants. (e.g., the UE may ignore subsequent uplink grants for a time period and may refrain from transmitting an uplink message in accordance with the third cooling period state for Z ms). After an expiration of a timer of the third cooling period state, the UE may determine that the network transmitted uplink grants during the third cooling period state and the UE may enter the first cooling period state based on the determination. By cycling through the different cooling states as described, a UE may be enabled with improved (e.g., ensured) temperature control while reducing the chance of data stalling.

In some examples, the UE may implement the various cooling period states in different orders, the UE may not implement some of the cooling period states, or the UE may implement additional cooling period states. For example, the UE may implement the illustrative configuration of cooling period states described above (e.g., first, second, third) for a first cycle. The UE may determine that the network did not respond to the second cooling period state (e.g., the network continued to send uplink grants in response to a TB including a BSR value of zero and a set of padding bits). The UE may implement a different configuration of cooling period states for subsequent cycles (e.g., first and third) based on the determination. That is, the UE may be configured with any combination of cooling period states and configurations for implementing the backoff schemes described herein.

At 420, the UE may initiate a traffic switching operation. In some examples, the UE may initiate the traffic switching operation based on detecting uplink grants during a cooling period state at 415. In some examples, the UE may initiate the traffic switching operation in addition or alternative to the backoff scheme described with reference to 410 and 415 (e.g., the UE may initiate the traffic switching operation based on determining that the temperature satisfies the threshold at 405).

The traffic switching operation may include transmitting one or more reference signals (e.g., SRSs) using a power different than a configured power. For example, the UE may identify a configuration for transmitting the reference signals. In some examples, the network (e.g., a base station) may indicate the configuration, for example, via radio resource control (RRC) signaling. The UE may determine a first power (e.g., the configured power) from the identified configuration. The UE may transmit the reference signals using a second power different than the first power (e.g., the second power may be smaller than the first power) as part of the traffic switching operation. The network may use the received reference signals to measure the quality of uplink carriers. In some examples, carriers for uplink transmission may be associated with different power amplifiers (e.g., that may overheat if burdened with high transmission power or scheduling load). The network may switch a traffic load (e.g., an uplink traffic throughput) to a different carrier based on the received reference signals. For example, by transmitting the reference signals on a first carrier with a lower transmission power (or by increasing an SRS transmission power in other carriers), the UE may force the network to switch the load to one or more other carriers (e.g., a second carrier). After such traffic switching, the UE may be enabled to let a power amplifier associated with the first carrier to cool down, which may avoid thermal shut down or device reset, among other benefits.

At 430, the UE may determine whether the temperature of one or more components satisfies a second threshold. For example, the UE may monitor the temperature of the power amplifier associated with the first carrier until the temperature satisfies (e.g., is less than) the second threshold. In such examples, the UE may return to normal operation at 425 (e.g., the UE or the base station may increase uplink traffic using the first carrier, a power amplifier, or both for uplink communications).

At 435, the UE may initiate a connection release operation. In some examples, the UE may initiate the connection release operation based on detecting uplink grants during a cooling period state at 415 or based on the traffic switching operation failing to reduce a temperature to a second threshold. In some examples, the UE may initiate the connection release operation in addition or alternative to the backoff scheme described with reference to 410 and 415 (e.g., the UE may initiate the traffic switching operation based on determining that the temperature satisfies the threshold at 405). As an illustrative example, if a UE is in a network with persistent uplink pre-scheduling that results in the UE being unable to cool down a temperature (e.g., a temperature of a power component in a cool down period), the UE may trigger the connection release operation (e.g., the connection release operation may be triggered by sensing a temperature of the power amplifier).

The connection release operation may include transmitting signaling to the base station. For example, the UE may shut down the RRC connection in a current (e.g., attached) RAT, which may result in a cool down period for a power amplifier associated with the RAT (e.g., the UE may refrain from reconnecting to the network using the first RAT for a time period, until a temperature of the power amplifier satisfies a second threshold, or both). In some examples, the UE may communicate in a non-standalone (NSA) mode and the signaling may indicate a SCG failure (e.g., with a Type: MaxReTx). In some other examples, the UE may communicate in a standalone (SA) mode and the signaling may indicate a NAS detach request (e.g., with a Type: Power Off). The UE may switch to an idle mode with a limited service capability based on shutting down the connection (e.g., the UE may only allow emergency calls, among other examples of limited service capabilities).

In some examples, the connection release operation may include the UE triggering an inter-RAT switch (e.g., inter-RAT mobility) to transition to a different RAT. For example, the signaling may indicate a measurement associated with the first RAT (e.g., a RAT corresponding to an overheated power amplifier). In some examples, the measurement may be muted or "faked" (e.g., the measurement may be different from an actual measurement) in order to trigger the network to switch RATs (e.g., based on the measurement indicating a relatively poor channel conditions, the network may trigger RAT mobility and signal to the UE to switch to a second RAT associated with different components of the UE). In such examples, switching to a second RAT for communications will enable the UE to shut off electronic components associated with the first RAT (e.g., sub6 power amplifiers) and allow them to cool off without disconnecting the service.

Figure 5:
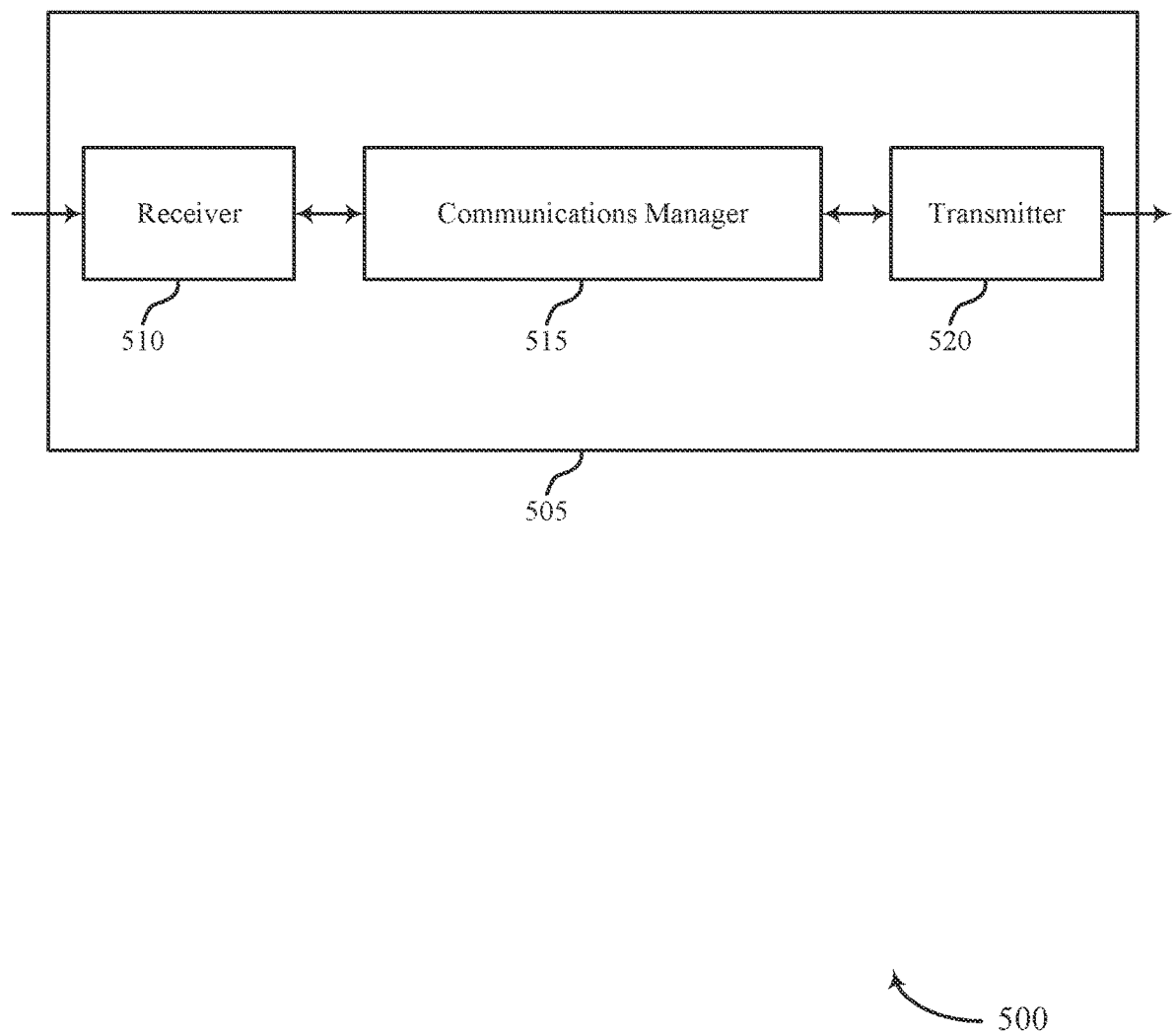
FIGS. 5 and 6 show block diagrams of devices that support techniques for shared channel backoff procedures in wireless communications systems in accordance with various aspects of the present disclosure.

FIG. 5 shows a block diagram 500 of a device 505 that supports techniques for shared channel backoff procedures in wireless communications systems in accordance with various aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for shared channel backoff procedures in wireless communications systems, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, via a first carrier associated with a first RAT, at least a first uplink grant from a base station, and transmit, using resources indicated by at least the first uplink grant, an uplink message based on a temperature of one or more components of the UE satisfying a threshold, the uplink message including a TB indicating data, a BSR associated with the data, one or more padding bytes different from the data, or any combination thereof. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 515 may realize one or more potential advantages. For example, the communications manager 515 may implement one or more backoff schemes as described herein. Such backoff schemes may enable a device, such as a UE, to ensure a desired temperature of one or more components of the UE while maintaining efficient communications (e.g., avoiding data stalling), among other benefits.

A processor of the UE (e.g., a processor in electronic communication with or including aspects of the receiver 510, the communications manager 515, and the transmitter 520) may realize one or more potential advantages. For example, the actions performed by the communications manager 515 may enable the UE to cool down, which may avoid thermal runaway and shutting down the processor of the UE in addition or alternative to decreasing processing complexity at the processor.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
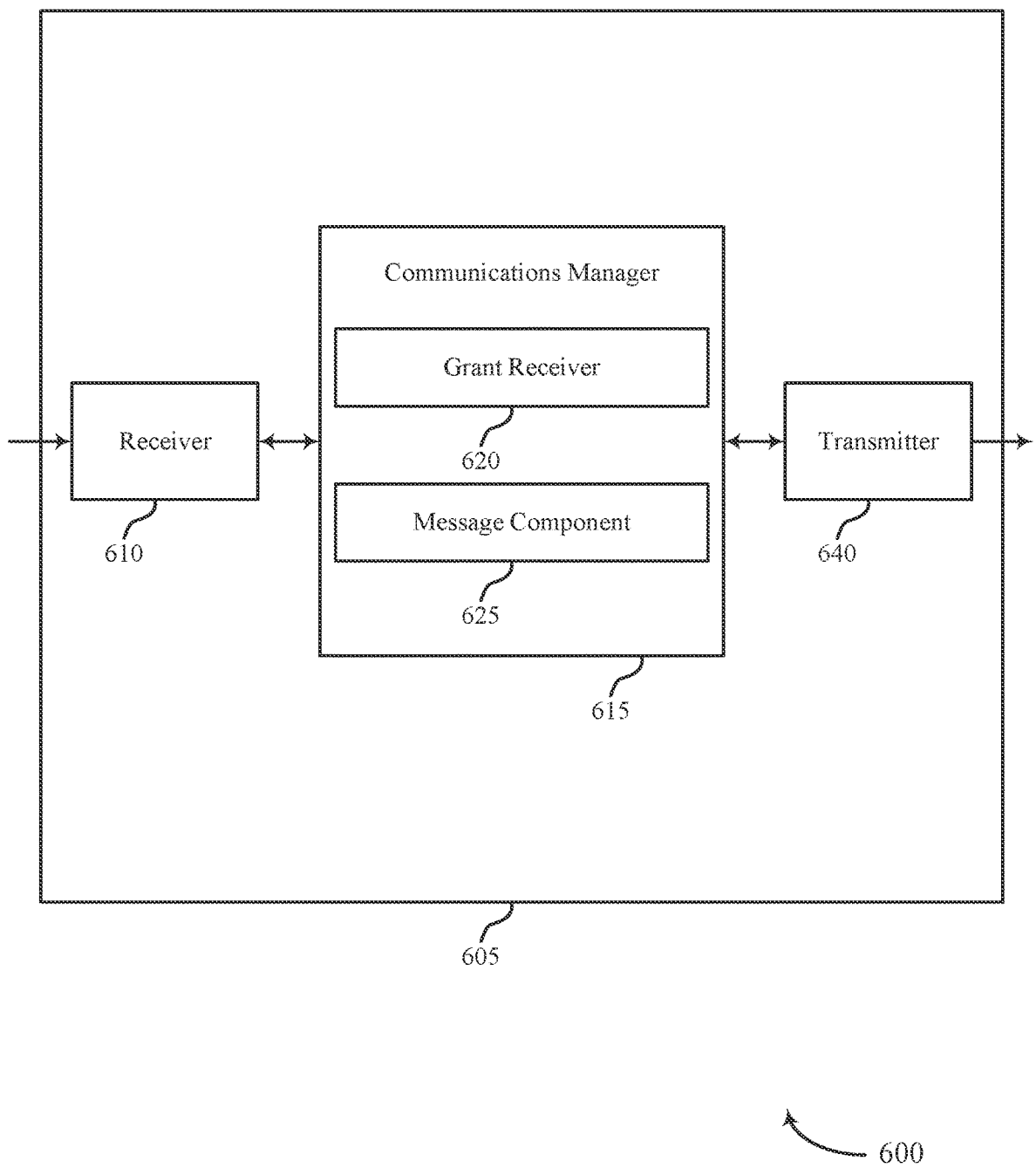

FIG. 6 shows a block diagram 600 of a device 605 that supports techniques for shared channel backoff procedures in wireless communications systems in accordance with various aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to techniques for shared channel backoff procedures in wireless communications systems, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a grant receiver 620 and a message component 625. The communications manager 615 may be an example of aspects of the communications manager 810 described herein.

The grant receiver 620 may receive, via a first carrier associated with a first RAT, at least a first uplink grant from a base station.

The message component 625 may transmit, using resources indicated by at least the first uplink grant, an uplink message based on a temperature of one or more components of the UE satisfying the threshold, the uplink message including a TB indicating data, a BSR associated with the data, one or more padding bytes different from the data, or any combination thereof.

The monitoring component 635 may monitor for at least a second uplink grant from the base station during a first time period based on transmitting the uplink message.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
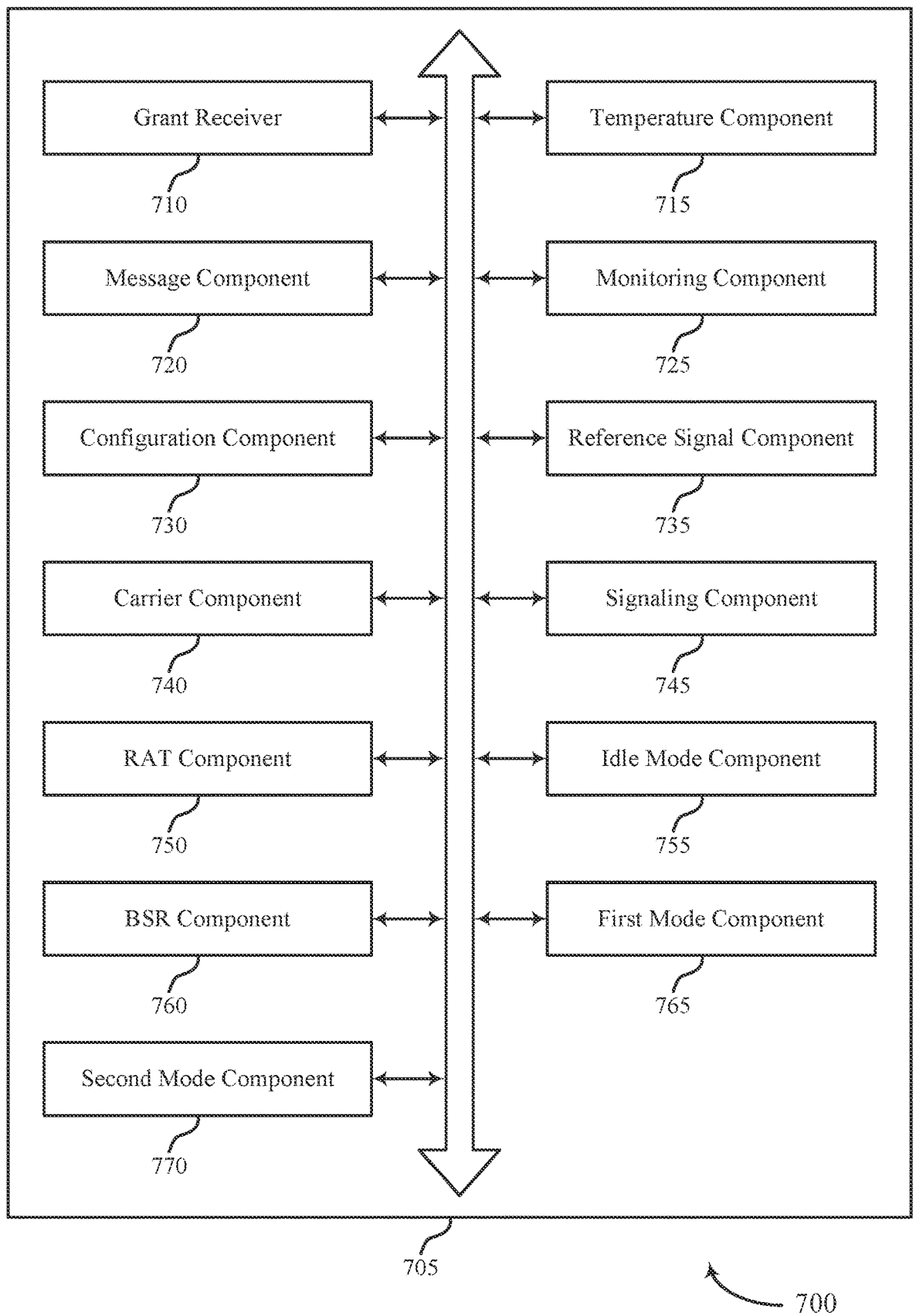
FIG. 7 shows a block diagram of a communications manager that supports techniques for shared channel backoff procedures in wireless communications systems in accordance with various aspects of the present disclosure.

FIG. 7 shows a block diagram 700 of a communications manager 705 that supports techniques for shared channel backoff procedures in wireless communications systems in accordance with various aspects of the present disclosure. The communications manager 705 may be an example of aspects of a communications manager 515, a communications manager 615, or a communications manager 810 described herein. The communications manager 705 may include a grant receiver 710, a temperature component 715, a message component 720, a monitoring component 725, a configuration component 730, a reference signal component 735, a carrier component 740, a signaling component 745, a RAT component 750, an idle mode component 755, a BSR component 760, a first mode component 765, and a second mode component 770. Each of these modules may communicate, directly or indirectly, with one another (e.g., via one or more buses).

The grant receiver 710 may receive, via a first carrier associated with a first RAT, at least a first uplink grant from a base station. In some examples, the grant receiver 710 may receive, from the base station, at least the second uplink grant during the first time period based on the monitoring. In some examples, the grant receiver 710 may receive, from the base station, at least the third uplink grant during the second time period based on the monitoring. In some examples, the grant receiver 710 may receive, from the base station, at least the second uplink grant during the first time period based on the monitoring.

The temperature component 715 may determine that a temperature of one or more components of the UE satisfies a threshold. In some examples, the temperature component 715 may determine that the temperature of the one or more components satisfies a second threshold.

The message component 720 may transmit, using resources indicated by at least the first uplink grant, an uplink message based on a temperature of one or more components of the UE satisfying a threshold, the uplink message including a TB indicating data, a BSR associated with the data, one or more padding bytes different from the data, or any combination thereof. In some examples, the message component 720 may transmit, using resources indicated by at least the second uplink grant, a second uplink message in response to receiving at least the second uplink grant, the second uplink message including a second TB indicating the BSR associated with the data and a set of padding bytes different from the data.

In some examples, the message component 720 may refrain, during a third time period, from transmitting a third uplink message in response to receiving at least the third uplink grant. In some examples, the message component 720 may refrain, during a second time period, from transmitting a second uplink message in response to receiving at least the second uplink grant.

The monitoring component 725 may monitor for at least a second uplink grant from the base station during a first time period based on transmitting the uplink message. In some examples, the monitoring component 725 may monitor for at least a third uplink grant from the base station during a second time period based on transmitting the second uplink message.

The configuration component 730 may identify a configuration for transmitting one or more reference signals in response to the first uplink grant, the configuration indicating a first power for transmitting the one or more reference signals.

The reference signal component 735 may transmit the one or more reference signals using a second power based on the temperature of the one or more components satisfying the threshold. In some cases, a value of the second power is less than a value of the first power.

The carrier component 740 may communicate with the base station via a second carrier different than the first carrier in response to the transmitted one or more reference signals.

The signaling component 745 may transmit signaling to the base station based on the temperature of the one or more components satisfying the threshold.

The RAT component 750 may communicate with the base station via a second RAT different from the first RAT based on transmitting the signaling.

The idle mode component 755 may operate in an idle mode based on transmitting the signaling. In some cases, the UE is operating in a standalone mode and the signaling includes the detach request. In some cases, the UE is operating in an NSA mode and the signaling includes the indication of the SCG failure.

The BSR component 760 may identify a first value of the BSR based on an amount of the application data, where the BSR indicates a second value different from the first value based on the temperature of the one or more components of the UE satisfying the threshold.

The first mode component 765 may operate in a first mode prior to receiving at least the first uplink grant. In some examples, the first mode component 765 may operate in the first mode upon expiration of a first time period based on failing to receive at least a second uplink grant from the base station. In some examples, the first mode component 765 may operate in the first mode based on the temperature satisfying the second threshold.

The second mode component 770 may operate in a second mode based on the temperature of the one or more components of the UE satisfying the threshold, the second mode including one or more cooling period states. In some examples, the second mode component 770 may refrain from transmitting first data to the base station in accordance with the second mode, the first data including at least a portion of application data. In some examples, the second mode component 770 may communicate second data with the base station in accordance with the second mode, the second data including control information, data associated with a higher priority than the first data, or a combination thereof.

Figure 8:
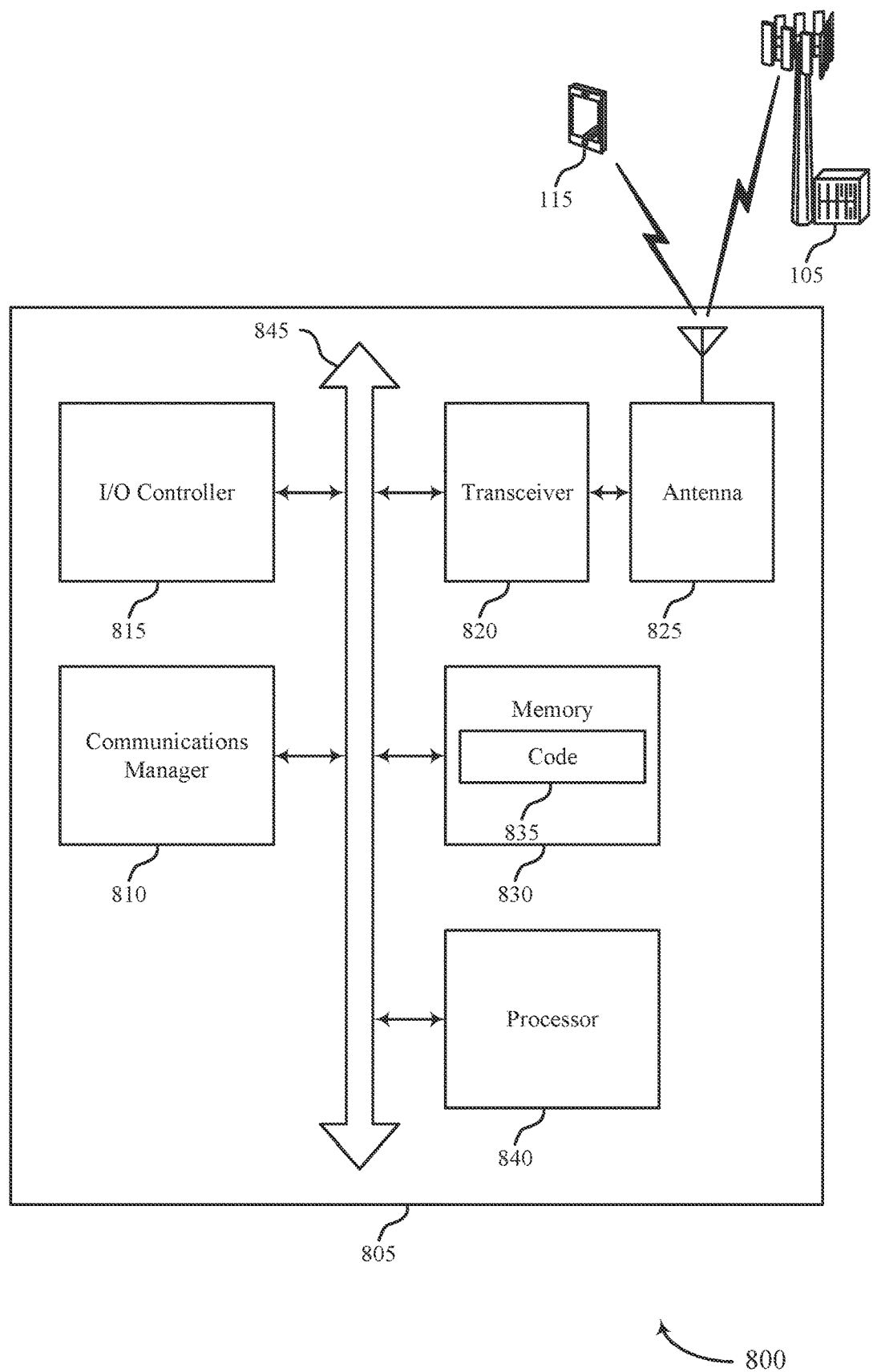
FIG. 8 shows a diagram of a system including a device that supports techniques for shared channel backoff procedures in wireless communications systems in accordance with various aspects of the present disclosure.

FIG. 8 shows a diagram of a system 800 including a device 805 that supports techniques for shared channel backoff procedures in wireless communications systems in accordance with various aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, via a first carrier associated with a first RAT, at least a first uplink grant from a base station, and transmit, using resources indicated by at least the first uplink grant, an uplink message based on a temperature of one or more components of the UE satisfying a threshold, the uplink message including a TB indicating data, a BSR associated with the data, one or more padding bytes different from the data, or any combination thereof, and monitor for at least a second uplink grant from the base station during a first time period based on transmitting the uplink message.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for shared channel backoff procedures in wireless communications systems).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
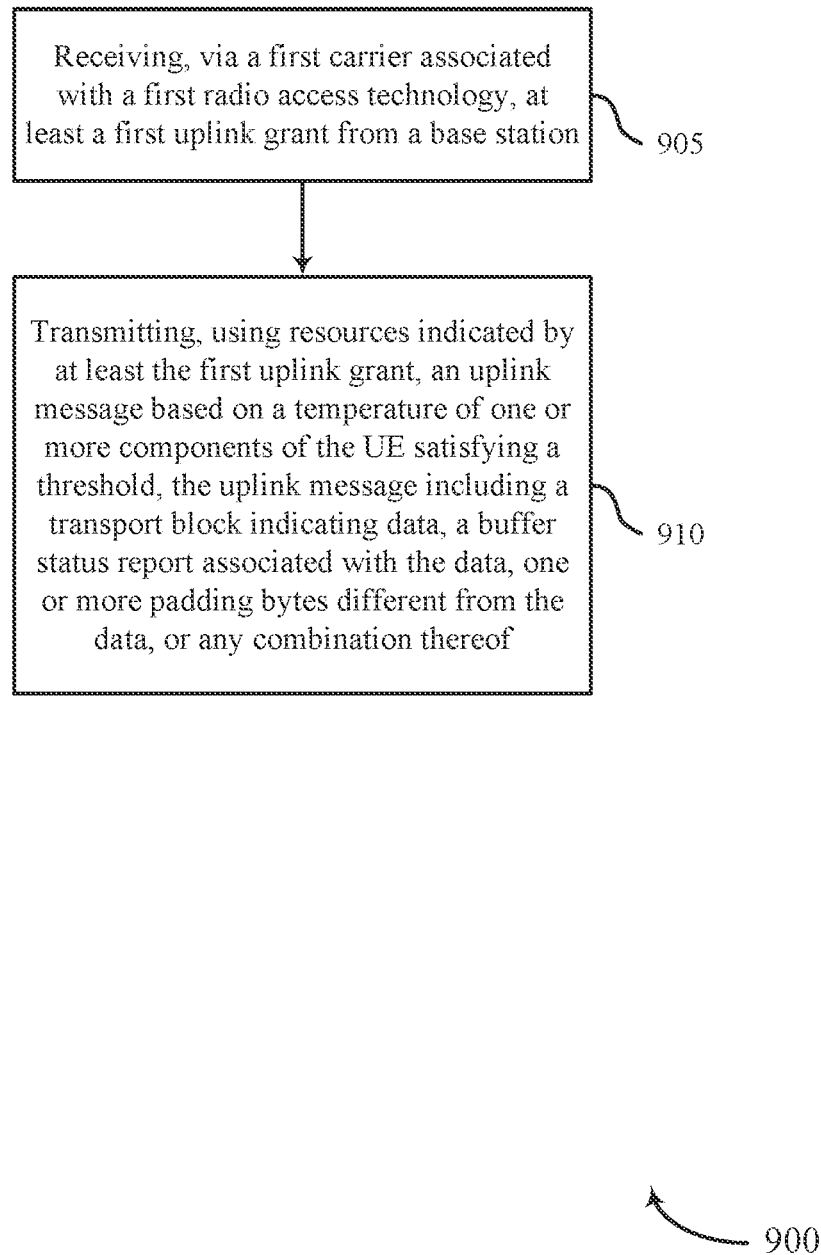
FIGS. 9 and 10 show flowcharts illustrating methods that support techniques for shared channel backoff procedures in wireless communications systems in accordance with various aspects of the present disclosure.

FIG. 9 shows a flowchart illustrating a method 900 that supports techniques for shared channel backoff procedures in wireless communications systems in accordance with various aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive, via a first carrier associated with a first RAT, at least a first uplink grant from a base station. The operations of 905 may be performed according to the methods described herein. In some examples, aspects of the operations of 905 may be performed by a grant receiver as described with reference to FIGS. 5 through 8.

At 910, the UE may transmit, using resources indicated by at least the first uplink grant, an uplink message based on a temperature of one or more components of the UE satisfying a threshold, the uplink message including a TB indicating data, a BSR associated with the data, one or more padding bytes different from the data, or any combination thereof. The operations of 915 may be performed according to the methods described herein. In some examples, aspects of the operations of 915 may be performed by a message component as described with reference to FIGS. 5 through 8.

Figure 10:
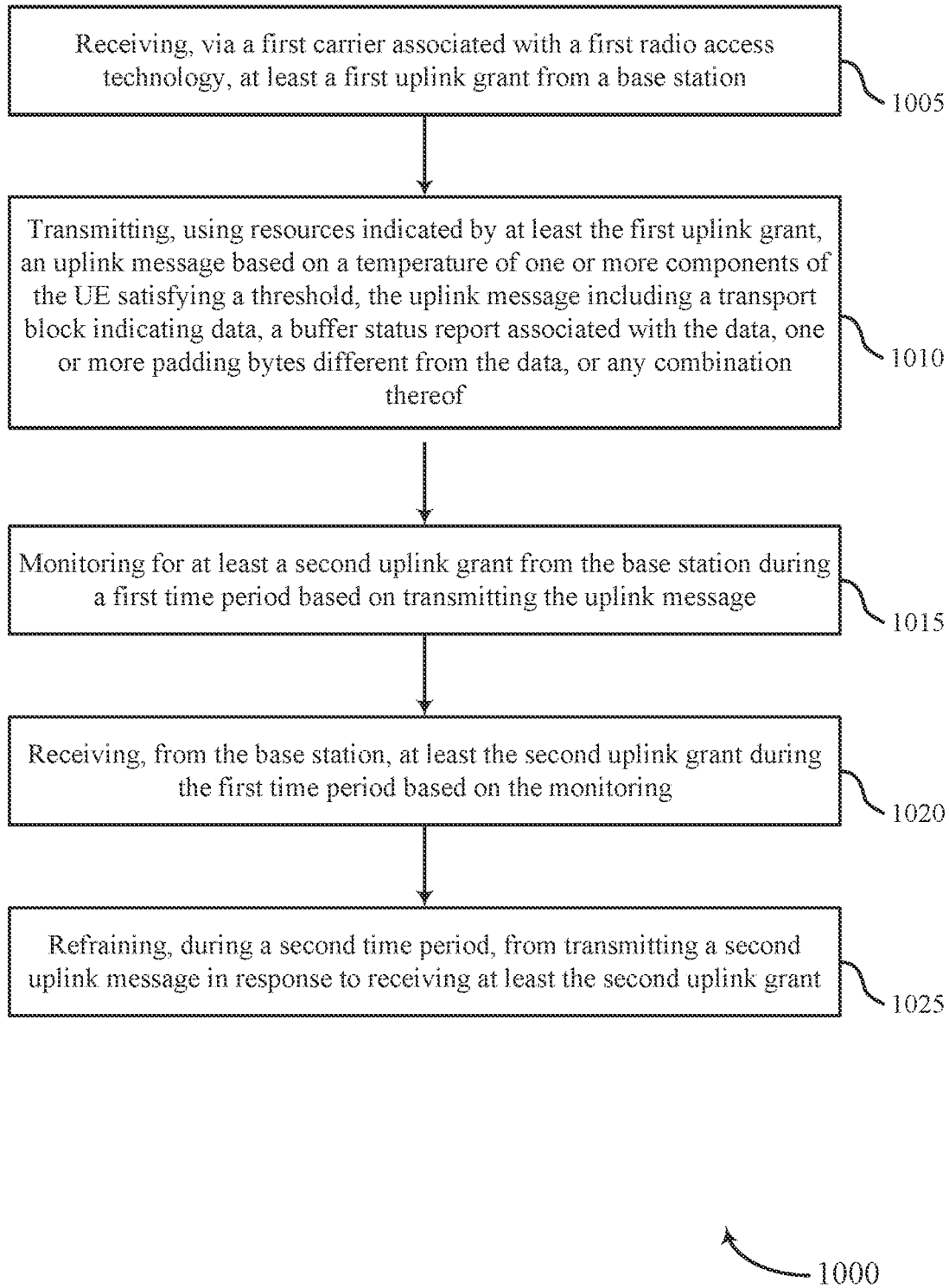

FIG. 10 shows a flowchart illustrating a method 1000 that supports techniques for shared channel backoff procedures in wireless communications systems in accordance with various aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive, via a first carrier associated with a first RAT, at least a first uplink grant from a base station. The operations of 1005 may be performed according to the methods described herein. In some examples, aspects of the operations of 1005 may be performed by a grant receiver as described with reference to FIGS. 5 through 8.

At 1010, the UE may transmit, using resources indicated by at least the first uplink grant, an uplink message based on a temperature of one or more components of the UE satisfying a threshold, the uplink message including a TB indicating data, a BSR associated with the data, one or more padding bytes different from the data, or any combination thereof. The operations of 1010 may be performed according to the methods described herein. In some examples, aspects of the operations of 1010 may be performed by a message component as described with reference to FIGS. 5 through 8.

At 1015, the UE may monitor for at least a second uplink grant from the base station during a first time period based on transmitting the uplink message. The operations of 1015 may be performed according to the methods described herein. In some examples, aspects of the operations of 1015 may be performed by a monitoring component as described with reference to FIGS. 5 through 8.

At 1020, the UE may receive, from the base station, at least the second uplink grant during the first time period based on the monitoring. The operations of 1020 may be performed according to the methods described herein. In some examples, aspects of the operations of 1020 may be performed by a grant receiver as described with reference to FIGS. 5 through 8.

At 1025, the UE may refrain, during a second time period, from transmitting a second uplink message in response to receiving at least the second uplink grant. The operations of 1025 may be performed according to the methods described herein. In some examples, aspects of the operations of 1025 may be performed by a message component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, via a first carrier associated with a first RAT, at least a first uplink grant from a base station; and transmitting, using resources indicated by at least the first uplink grant, an uplink message based at least in part on a temperature of one or more components of the UE satisfying a threshold, the uplink message including a TB indicating data, a BSR associated with the data, one or more padding bytes different from the data, or any combination thereof.

Aspect 2: The method of aspect 1, further comprising: monitoring for at least a second uplink grant from the base station during a first time period based at least in part on transmitting the uplink message.

Aspect 3: The method of any of aspects 1 through 2, further comprising: receiving, from the base station, at least the second uplink grant during the first time period based at least in part on the monitoring; transmitting, using resources indicated by at least the second uplink grant, a second uplink message in response to receiving at least the second uplink grant, the second uplink message comprising a second TB indicating the BSR associated with the data and a plurality of padding bytes different from the data; and monitoring for at least a third uplink grant from the base station during a second time period based at least in part on transmitting the second uplink message.

Aspect 4: The method of aspect 3, further comprising: receiving, from the base station, at least the third uplink grant during the second time period based at least in part on the monitoring; and refraining, during a third time period, from transmitting a third uplink message in response to receiving at least the third uplink grant.

Aspect 5: The method of any of aspects 1 through 4, further comprising: receiving, from the base station, at least the second uplink grant during the first time period based at least in part on the monitoring; and refraining, during a second time period, from transmitting a second uplink message in response to receiving at least the second uplink grant.

Aspect 6: The method of any of aspects 1 through 5, further comprising: identifying a configuration for transmitting one or more reference signals in response to the first uplink grant, the configuration indicating a first power for transmitting the one or more reference signals; and transmitting the one or more reference signals using a second power based at least in part on the temperature of the one or more components satisfying the threshold.

Aspect 7: The method of aspect 6, wherein a value of the second power is less than a value of the first power.

Aspect 8: The method of any of aspects 6 through 7, further comprising: communicating with the base station via a second carrier different than the first carrier in response to the transmitted one or more reference signals.

Aspect 9: The method of any of aspects 1 through 8, further comprising: transmitting signaling to the base station based at least in part on the temperature of the one or more components of the UE satisfying the threshold.

Aspect 10: The method of aspect 9, wherein the signaling indicates a measurement associated with the first RAT, further comprising: communicating with the base station via a second RAT different from the first RAT based at least in part on transmitting the signaling.

Aspect 11: The method of any of aspects 9 through 10, wherein the signaling comprises a detach request for the first RAT or an indication of a SCG failure, further comprising: operating in an idle mode based at least in part on transmitting the signaling.

Aspect 12: The method of aspect 11, wherein the UE is operating in a standalone mode and the signaling comprises the detach request.

Aspect 13: The method of any of aspects 11 through 12, wherein the UE is operating in an NSA mode and the signaling comprises the indication of the SCG failure.

Aspect 14: The method of any of aspects 1 through 13, wherein the data comprises application data of the UE, further comprising: identifying a first value of the BSR based at least in part on an amount of the application data, wherein the BSR indicates a second value different from the first value based at least in part on the temperature of the one or more components of the UE satisfying the threshold.

Aspect 15: The method of any of aspects 1 through 14, further comprising: operating in a first mode prior to receiving at least the first uplink grant; and operating in a second mode based at least in part on the temperature of the one or more components of the UE satisfying the threshold, the second mode comprising one or more cooling period states.

Aspect 16: The method of aspect 15, wherein operating in the second mode comprises: refraining from transmitting first data to the base station in accordance with the second mode, the first data comprising at least a portion of application data; and communicating second data with the base station in accordance with the second mode, the second data comprising control information, data associated with a higher priority than the first data, or a combination thereof.

Aspect 17: The method of any of aspects 15 through 16, further comprising: operating in the first mode upon expiration of a first time period based at least in part on failing to receive at least a second uplink grant from the base station.

Aspect 18: The method of any of aspects 15 through 17, further comprising: determining that the temperature of the one or more components satisfies a second threshold; and operating in the first mode based at least in part on the temperature satisfying the second threshold.

Aspect 19: An apparatus for wireless communications at a UE, comprising a processor; memory coupled with the processor; and instructions stored in the memory and executable by the processor to cause the apparatus to perform a method of any of aspects 1 through 18.

Aspect 20: An apparatus for wireless communications at a UE, comprising at least one means for performing a method of any of aspects 1 through 18.

Aspect 21: A non-transitory computer-readable medium storing code for wireless communications at a UE, the code comprising instructions executable by a processor to perform a method of any of aspects 1 through 18.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
receiving, via a first carrier associated with a first radio access technology, at least a first uplink grant from a network entity; and
transmitting, using resources indicated by at least the first uplink grant, an uplink transmission based at least in part on a temperature of one or more components of the UE satisfying a threshold, the uplink transmission including a buffer status report having a value of zero, one or more data bytes, and one or more padding bytes different from the one or more data bytes, wherein the one or more data bytes include one or more bytes of application data from a buffer at the UE, the buffer includes a different quantity of data than indicated in the buffer status report.

2. The method of claim 1, further comprising:
monitoring for at least a second uplink grant from the network entity during a first time period based at least in part on transmitting the uplink transmission.

3. The method of claim 2, further comprising:
receiving, from the network entity, at least the second uplink grant during the first time period based at least in part on the monitoring;
transmitting, using resources indicated by at least the second uplink grant, a second uplink transmission in response to receiving at least the second uplink grant, wherein the second uplink transmission includes the buffer status report, one or more data bytes, and a plurality of padding bytes different from the one or more data bytes, or any combination thereof; and
monitoring for at least a third uplink grant from the network entity during a second time period based at least in part on transmitting the second uplink transmission.

4. The method of claim 3, further comprising:
receiving, from the network entity, at least the third uplink grant during the second time period based at least in part on the monitoring.

5. The method of claim 2, further comprising:
receiving, from the network entity, at least the second uplink grant during the first time period based at least in part on the monitoring for at least the second uplink grant.

6. The method of claim 1, further comprising:
identifying a configuration for transmitting one or more reference signals in response to the first uplink grant, the configuration indicating a first power for transmitting the one or more reference signals; and
transmitting the one or more reference signals using a second power based at least in part on the temperature of the one or more components satisfying the threshold.

7. The method of claim 6, wherein a value of the second power is less than a value of the first power.

8. The method of claim 6, further comprising:
communicating with the network entity via a second carrier different from the first carrier in response to the transmitted one or more reference signals.

9. The method of claim 1, further comprising:
transmitting signaling to the network entity based at least in part on the temperature of the one or more components of the UE satisfying the threshold.

10. The method of claim 9, wherein the signaling indicates a measurement associated with the first radio access technology, further comprising:
communicating with the network entity via a second radio access technology different from the first radio access technology based at least in part on transmitting the signaling.

11. The method of claim 9, wherein the signaling comprises a detach request for the first radio access technology or an indication of a secondary cell group failure, further comprising:
operating in an idle mode based at least in part on transmitting the signaling.

12. The method of claim 11, wherein the UE is operating in a standalone mode and the signaling comprises the detach request.

13. The method of claim 11, wherein the UE is operating in a non-standalone mode and the signaling comprises the indication of the secondary cell group failure.

14. The method of claim 1, further comprising:
identifying a first value of the buffer status report based at least in part on an amount of the application data, wherein the buffer status report is a second value different from the first value based at least in part on the temperature of the one or more components of the UE satisfying the threshold.

15. The method of claim 1, further comprising:
operating in a first mode prior to receiving at least the first uplink grant; and
operating in a second mode based at least in part on the temperature of the one or more components of the UE satisfying the threshold, the second mode comprising one or more cooling period states.

16. The method of claim 15, wherein operating in the second mode comprises:
refraining from transmitting first data to the network entity in accordance with the second mode, the first data comprising at least a portion of application data; and
communicating second data with the network entity in accordance with the second mode, the second data comprising control information, data associated with a higher priority than the first data, or a combination thereof.

17. The method of claim 15, further comprising:
operating in the first mode upon expiration of a first time period based at least in part on failing to receive at least a second uplink grant from the network entity.

18. The method of claim 15, further comprising:
determining that the temperature of the one or more components satisfies a second threshold; and
operating in the first mode based at least in part on the temperature satisfying the second threshold.

19. A user equipment (UE) for wireless communication, comprising:
one or more memories storing processor-executable code; and one or more processors coupled with the one or more memories and individually or collectively operable to execute the code to cause the UE to:
  receive, via a first carrier associated with a first radio access technology, at least a first uplink grant from a network entity; and
  transmit, using resources indicated by at least the first uplink grant, an uplink transmission based at least in part on a temperature of one or more components of the UE satisfying a threshold, the uplink transmission including a buffer status report having a value of zero, one or more data bytes, and one or more padding bytes different from the one or more data bytes, wherein the one or more data bytes include one or more bytes of application data from a buffer at the UE, the buffer includes a different quantity of data than indicated in the buffer status report.

20. The UE of claim 19, wherein the one or more processors are individually or collectively further operable to execute the code to cause the UE to:
  monitor for at least a second uplink grant from the network entity during a first time period based at least in part on transmitting the uplink transmission.

21. The UE of claim 20, wherein the one or more processors are individually or collectively further operable to execute the code to cause the UE to:
  receive, from the network entity, at least the second uplink grant during the first time period based at least in part on the monitoring;
  transmit, using resources indicated by at least the second uplink grant, a second uplink transmission in response to receiving at least the second uplink grant, wherein the second uplink transmission includes the buffer status report, one or more data bytes, and a plurality of padding bytes different from the one or more data bytes, or any combination thereof; and
  monitor for at least a third uplink grant from the network entity during a second time period based at least in part on transmitting the second uplink transmission.

22. The UE of claim 21, wherein the one or more processors are individually or collectively further operable to execute the code to cause the UE to:
  receive, from the network entity, at least the third uplink grant during the second time period based at least in part on the monitoring.

23. The UE of claim 20, wherein the one or more processors are individually or collectively further operable to execute the code to cause the UE to:
  receive, from the network entity, at least the second uplink grant during the first time period based at least in part on the monitoring for at least the second uplink grant.

24. The UE of claim 19, wherein the one or more processors are individually or collectively further operable to execute the code to cause the UE to:
  identify a configuration for transmitting one or more reference signals in response to the first uplink grant, the configuration indicating a first power for transmitting the one or more reference signals; and
  transmit the one or more reference signals using a second power based at least in part on determining that the temperature of the one or more components satisfies the threshold.

25. The UE of claim 24, wherein a value of the second power is less than a value of the first power.

26. The UE of claim 24, wherein the one or more processors are individually or collectively further operable to execute the code to cause the UE to:
  communicate with the network entity via a second carrier different from the first carrier in response to the transmitted one or more reference signals.

27. The UE of claim 19, wherein the one or more processors are individually or collectively further operable to execute the code to cause the UE to:
  transmit signaling to the network entity based at least in part on the temperature of the one or more components of the UE satisfying the threshold.

28. A user equipment (UE) for wireless communications, comprising:
  means for receiving, via a first carrier associated with a first radio access technology, at least a first uplink grant from a network entity; and
  means for transmitting, using resources indicated by at least the first uplink grant, an uplink transmission based at least in part on a temperature of one or more components of the UE satisfying a threshold, the uplink transmission including a buffer status report having a value of zero, one or more data bytes, and one or more padding bytes different from the one or more data bytes, wherein the one or more data bytes include one or more bytes of application data from a buffer at the UE, the buffer includes a different quantity of data than indicated in the buffer status report.

29. A non-transitory computer-readable medium storing code for wireless communications at a user equipment (UE), the code comprising instructions executable by one or more processors to:
  receive, via a first carrier associated with a first radio access technology, at least a first uplink grant from a network entity; and
  transmit, using resources indicated by at least the first uplink grant, an uplink transmission based at least in part on a temperature of one or more components of the UE satisfying a threshold, the uplink transmission including a buffer status report having a value of zero, one or more data bytes, and one or more padding bytes different from the one or more data bytes, wherein the one or more data bytes include one or more bytes of application data from a buffer at the UE, the buffer includes a different quantity of data than indicated in the buffer status report.

* * * * *